Dec. 12, 1967  W. PENNINGTON ET AL  3,357,120
INDICIA PROJECTION ASSEMBLY
Filed July 8, 1965  2 Sheets-Sheet 2
FIG. 7.
| DIGIT DISPLAYED | STATE OF BCD SIGNAL ACTUATORS | | | |
|---|---|---|---|---|
| | 23 | 24 | 25 | 26 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
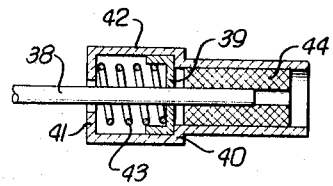
FIG. 11.
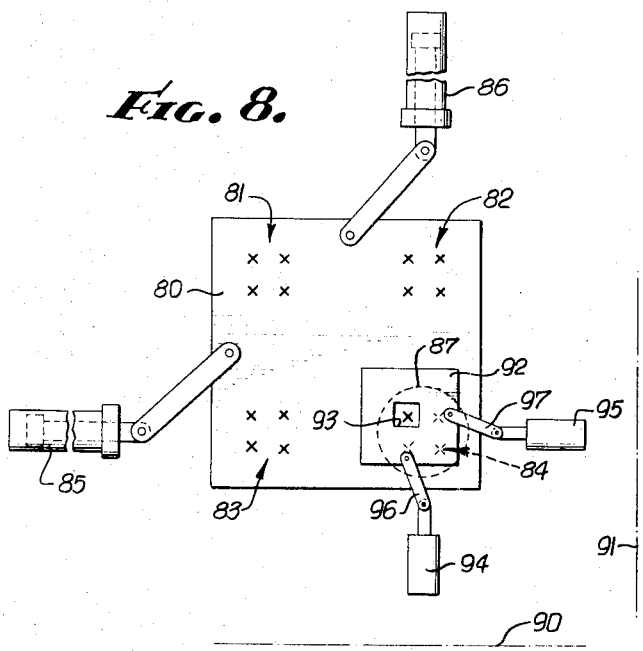
FIG. 8.
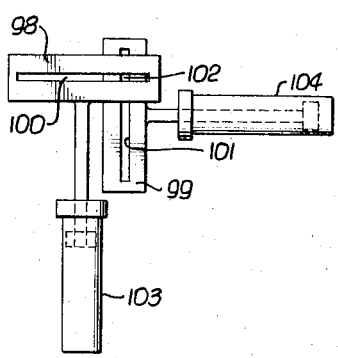
FIG. 9.
FIG. 10.
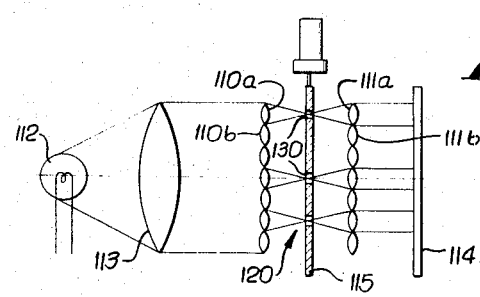
INVENTORS.
WILLIAM PENNINGTON
YING-NIEN YU
BY White & Haefliger
ATTORNEYS.

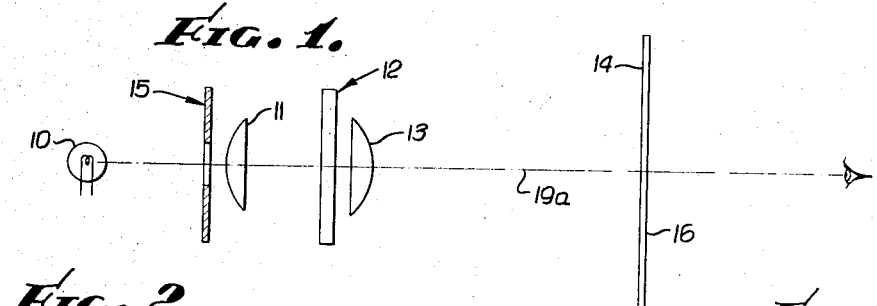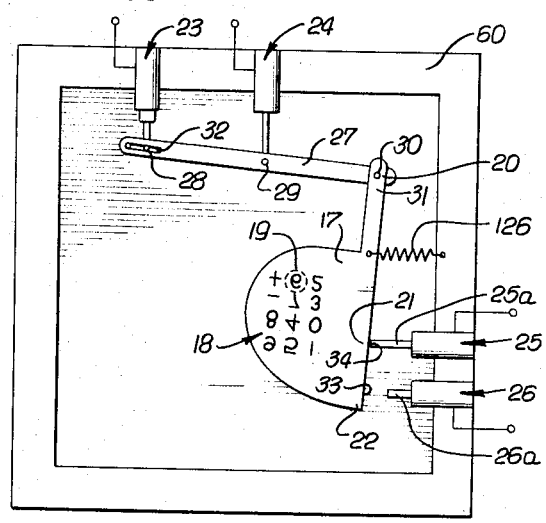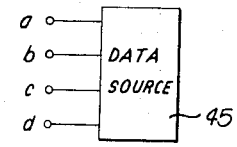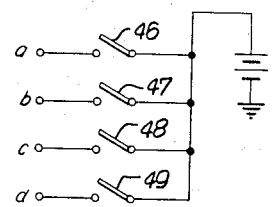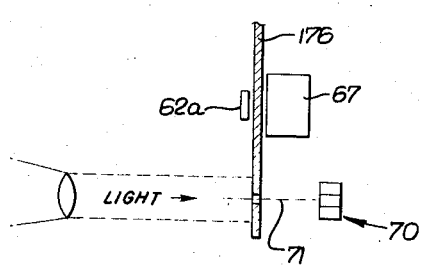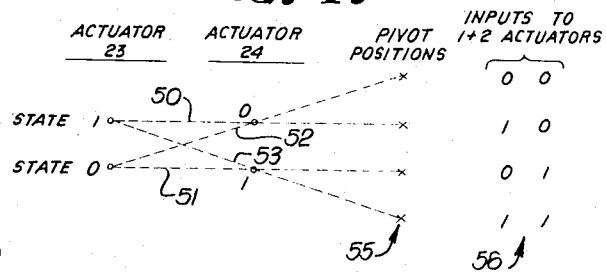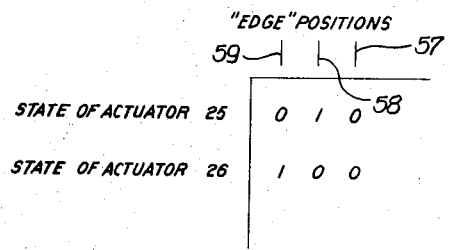
INVENTORS.
WILLIAM PENNINGTON
YING-NIEN YU
By White & Haefliger
ATTORNEYS.

United States Patent Office 3,357,120
Patented Dec. 12, 1967

3,357,120
INDICIA PROJECTION ASSEMBLY
William Pennington and Ying-Nien Yu, Los Angeles, Calif., assignors to Digital Systems Company, Los Angeles, Calif., a partnership
Filed July 8, 1965, Ser. No. 470,422
20 Claims. (Cl. 40—28)

This invention relates generally to information transformation, and more particularly concerns method and apparatus for transmitting radiation such as light in accordance with an informational symbol sequence.

One application of the present invention has to do with the display of visible symbols in response to control signals. Past devices performing this function lack the unusual combinations and subcombinations of advantages which are characteristic of the present invention, as will appear from the detailed description herein. For example, conventional luminous digital displays suffer from lack of sufficient luminous intensity (as for example where a number of glow wires are super-imposed) as well as undesirable complexity and cost, these disadvantages as well as others being overcome by the present invention.

Basically, the apparatus of the present invention is adapted for use in combination with radiation directed in a confined path, and includes a radiation inhibitor, as for example a light mask, containing a two-dimensional array of radiation passing symbol zones, together with means to displace the inhibitor in multiple dimensional relation to the incident radiation path to bring successive of the zones into the radiation path, thereby to pass the radiation in accordance with an informational symbol sequence. Typically, the inhibitor displacing means comprises multiple independently operable actuators connected to displace the inhibitor or mask at multiple locations, at each of which the mask is supported for displacement. In one unusually advantageous form of the device, the actuator means also includes a motion transmitting lever to which two of the actuators have motion transmitting connection for rotating and translating the lever, the mask and lever also having pivotal interconnection, and two other actuators have motion transmitting connection to the mask to pivot it about its pivotal interconnection with the lever.

Other objects of the invention include the provision with the above described apparatus of a light projection system for directing light in the mentioned confined path, as well as image display means in the path of the light transmitted by the mask zones; the provision of movable mask zones that define arabic numerals for use in digital display incorporating the above apparatus; the provision of means to controllably cover and uncover a decimal symbol zone associated with the mask; the provision of a mask defining multiple spaced groups of symbol zones, together with additional light masking apparatus defining a window arranged to pass light to illuminate less than all of the zones of a selected group, actuators being connected to independently operate both masks in a novel manner to be described; and the provision of a mask containing an array of light passing symbol zones, a light projection system for directing light in multiple generally parallel paths, and actuator means connected to displace the mask in relation to said light paths to bring selected symbol zones into such paths.

In its method aspects, the invention basically includes the steps of directing radiation in a confined path and toward a portion of the inhibitor or mask, and effecting displacement of the latter in multiple dimensional relation to said path to bring successive of the radiation passing symbol zones into the radiation path, thereby to pass the radiation in accordance with an informational symbol sequence. Typically, the displacing step may include both translating and pivoting the inhibitor or mask, and a further step includes releasably locking the mask in position with a selected symbol zone in the radiation path. Further, the displacement step is advantageously carried out by effecting independent operation of actuators to independently displace the mask at multiple locations, as for example four locations, as will appear; and finally, the invention may include the step of displaying light passed through the symbol zones. Inasmuch as the mask may be extremely light and capable of rapid and varied displacement, it is seen that a device of low complexity and cost is provided, for use with a high intensity light source to achieve a high luminous intensity symbol image display.

These and other objects and advantages of the invention, as well as the details of illustrative embodiments, will be more fully understood from the following detailed description of the drawings in which:

FIG. 1 is a showing of an optical display system incorporating the invention;

FIG. 2 is an enlarged view of one preferred form of radiation or light mask, together with associated actuators and connections;

FIG. 3 is a side elevation of a mask together with means to clamp or lock it in position;

FIG. 4 is a diagrammatic showing of the actuator lever positions in the FIG. 2 form of the invention;

FIG. 5 is a tabulation of the "edge" positions assumed by the mask of FIG. 2 in response to operation of two actuators thereof;

FIG. 6 is a fragmentary view of a decimal symbol control means;

FIG. 7 is a tabulation of digit displayed vs. actuator state respecting FIG. 2;

FIG. 8 is a view similar to FIG. 2 but showing a modified form of the invention;

FIG. 9 is a view of a multiple mask control, as usable in the FIG. 8 modification;

FIG. 10 is a view similar to FIG. 1 but showing yet another modified form of the invention; and FIG. 11 is a vertical section taken through actuator usable in the various forms of the invention.

Referring first to FIG. 1, a typical projection system incorporating the invention includes a light source 10, condenser lens 11, light mask system or radiation inhibitor 12, projection lens 13 and viewing screen 14. The source 10 could be replaced by an arc light, gas lamp, or other electro-luminescent source also, radiation other than light may be used. The condenser lens might be replaced by a curved mirror, or a convergent light pipe, or might be eliminated if a near "point" radiation source is used. A light stop serving this latter function, or a similar function, is indicated at 15. The projection lens 13 might be replaced by a curved mirror, a Fresnel plate, or even be eliminated if a near "point" radiation source is used. Display screen 14 may be a clear plate, as for example glass or plastic, having a frosted outer viewing surface 16. It may be replaced by a thin, semi-transparent sheet having a light diffusing capacity or property, as for example milkglass or plastic, and the thin sheet may be bonded to a clear or transparent plate for strength.

In accordance with the invention, the radiation inhibitor 12 contains a two-dimensional array of radiation passing symbol zones; for example, the inhibitor may comprise a thin, light-weight plate 17 acting as a light mask (for example an inhibitor on a glass plate), excepting for the light passing cut-out zones 18 better seen in FIG. 2. While the cut-out zones have arabic digit configuration (reversed and upside down in FIG. 2), they may have other symbolic form in conformance with the information transformation to be effected. Plate 17 extends in a plane normal to the optic axis 19a.

The invention also contemplates the provision of means to displace the inhibitor or mask in multiple dimensional relation to the confined path of incident radiation to bring successive of the zones into the radiation path, thereby to pass the radiation in accordance with an informational symbol sequence. In this regard, a typical confined path of incident light radiation is indicated by the broken line circle 19 in FIG. 2, the special location of the circle remaining fixed, and the mask 17 being subjected to two dimensional displacement to bring successive number zones 18 into that path. Such displacement is advantageously effected by actuator means connected to support as well as effect displacement of the mask at spaced locations. The optic axis 19a passes through the center of circle 19.

In the form of the invention seen in FIG. 2, the mask has three locations 20–22 to which displacement is respectively transmitted by four actuators 23–26. In this regard, the actuator means may be considered to include a motion transmitting lever 27 to which two actuators 23 and 24 have motion transmitting pivotal connection at 28 and 29 for translating and rotating the lever, the lever and a mask arm 31 having pivotal interconnection at 30. Pivot 28 may be considered as part of a lost motion connection, that also includes a slot 32 in the lever. The remaining two actuators 25 and 26 and the mask have provision for push interengagement at 33 and 34, for pivoting the mask about pivot 30. Actuators 25 and 26 have push elements 25a and 26a to selectively urge the mask clockwise, a mask return spring being provided at 126. Alternately mask engagement with element 25a or 26a may be secured by mask weight exerting a counterclockwise movement about pivot 30.

Each actuator typically has a motion transmitting element movable between two predetermined positions, corresponding for examples to the states "1" and "0" in a binary code system. One such actuator is seen in FIG. 11 to have a motion transmitting element or plunger 38 carrying a flange magnet 39 movable between stops 40 and 41 provided by the actuator housing 42. Flange magnet 39 is urged against stop 40 by compression spring 43, and it is urged against stop 41 when a guide coil 44 is electrically energized to establish a magnetic field activity to repel the magnet. Many other different forms of actuators are also usable. FIG. 2a shows a source 45 of data signals to operate the actuators 23–26, the source and the actuator coils having corresponding terminals "a" through "d" as indicated. FIG. 2b shows a bank of switches 46–49 individually manually operable to operate the respective actuators 23–26, the switches and actuator coils saving corresponding terminals "a" through "d" as indicated. Alternative types of actuators would include electrostatic (moving plate or dielectric), and electrothermal (resistance coil and bimetallic strip) devices.

In FIG. 4, the numerals 50–53 indicate the four possible positions of the lever 27 corresponding to the possible states of the actuators 23 and 24. Thus, position 50 corresponds to actuator 23 in "1" state and actuator 24 in "0" state; position 51 corresponds to actuator 23 in "0" state and actuator 24 in "1" state; position 52 corresponds to actuator 23 in "0" state and actuator 24 in "0" state; and position 53 corresponds to both actuators in "1" state. The bank of four corresponding positions of the pivot 30 is indicated at 55, and the inputs to the actuators are indicated by the tabular column 56.

In FIG. 5, the numerals 57, 58 and 59 indicate the three possible "edge" positions of the mask edge 60, and the corresponding "0" and "1" states of the actuators 25 and 26 are indicated in the tabulation. In this regard, actuator 26 may be constructed to produce greater "1" state motion to the left than actuator 25, as clearly appears in the tabulation. For example, actuator 25 may be constructed so that when energized its movable element (say element 38 in FIG. 11) moves leftwardly to carry flange 39 only half the distance between stops 40 and 41, whereas actuator may be constructed so that when energized its flange 39 moves all the way toward and against stop 41.

Referring to FIG. 7, the digits 0 through 9, as formed by the cut-out zones in the mask, may be displayed on screen 14 as a result of being brought into the confined path of the projected light beam, in response to reception by the actuators of binary coded decimal (BCD) electrical signals. The latter are typically produced by electronic counters and computers, as represented by source 45 in FIG. 2a. The left column in FIG. 7, indicates the arabic digits, corresponding to the states of the actuators 23–26 set out in the right column or tabulation. In this regard, the mask is rapidly movable to bring the nine digits into the path 19 of the projected light beam, as commanded by the states of the actuators. Inasmuch as the mask has twelve possible positions, ten of which correspond to display of the numerals 0 through 9, there are two additional positions which may for example have display zones such as "+" and "−" to effect projected display of such symbols.

FIG. 6 illustrates a flag 62 operated by an actuator 63 to pivot about point 64, for covering or uncovering a decimal point symbol 65 associated with a numerical symbol "5" on a mask 17a operated by actuators in a manner similar to that explained in FIG. 2. The incident light beam is confined within circle 66.

FIG. 3 illustrates one type of memory clamp providing means for holding a displayed digit despite change of BCD signals received by the actuators. The clamp includes an electromagnet 67 of sufficient strength when energized to hold the principal mask 17b and the mask 62a (corresponding to the decimal point mask or flag 62 in FIG. 6) against force imposed by their actuators. Masks 17b and 62a are shown in edge view in FIG. 3, and may comprise magnetic metal. Mask 17b corresponds to mask 17 in FIG. 2.

Variations of the FIG. 2 arrangement would include different numbers of actuators "n," the number of symbols capable of independent display being determined by the value of the expression $2^n$. Thus, the addition of each actuator doubles the display capacity. The mask need not be flat, but may in general be a continuously curved surface. Thus, a cylindrical mask might have two rotary actuators coupled to turn it about its axis, plus two linear actuators coupled to translate the mask along its axis, giving 16 mask positions. Further, the mask could be actuated by non-electric actuators, as for example of fluid responsive type. Other applications would include use of the device to translate four line BCD signals to ten line decimal signals, as facilitated by addition of an electrical contact on the number mask and ten properly positioned fixed contacts. This can also be accomplished by passing different light beams, one for each displayed digit, so that one and only one characteristic photocell would be energized for each digit displayed. In FIG. 3 a bank of photocells 70 is arranged so that only one cell receives a light beam 71 for each mask position, the beam passing through a small opening in the mask 17b. The light patterns and symbols produced by the device of the present invention may also be utilized for other viewing purposes, as for example photographically recording a complete line of text material simultaneously, using an array of the display devices. With moderately powered actuators, text lines could be recorded at speeds of about 100 lines per second.

Referring now to FIG. 8, it illustrates another form of the invention wherein a mask 80 contains symbol zones indicated by "X" marks, and arranged in groups 81, 82, 83 and 84. The actuators 85 and 86 each have a "0" and "1" state, so as to selectively bring any of the groups into the path of incident light indicated by broken line 87. Connectors to transmit motion from the actuators to the mask, and to support the mask, are indicated at 88 and 89. The mask is in its upper and leftward position, the downward and rightward positions being indicated by broken lines 90 and 91.

An additional mask 92 defines a window 93 arranged to pass light to illuminate less than all of the symbol zones in a selected group, as for example one "*x*" symbol zone as shown. Additional actuators 94 and 95 are connectors 96 and 97 are provided to displace mask 92 in such parallel relation to mask 80 that light passed by window 93 selectively illuminates the symbol zones of a selected group, as for example the different zones in group 84. Instead of a single additional mask 92, two such masks 98 and 99 may be provided as seen in FIG. 9, with elongated windows 100 and 101 that intersect at aperture 102 to pass the light, linear actuators for the masks being seen at 103 and 104.

Referring finally to FIG. 10, it includes a light projection system for directing light in multiple generally parallel paths 120, as for example are defined by the paral'el axes between pairs of small projection lenses 110*a* and 111*a*, 110*b* and 111*b*, etc., formed two dimensionally on two sheets seen in edge view. The projection system also may include a suitable light source 112, collimating lens 113, and display sheet 114.

The mask 115, seen in edge view, contains an array of small areas 130 each of which contains a total number "*n*" of light beams passing and light beams interrupting symbol zones of selected shape. For example, each area 130 might contain 10 horizontal and 10 vertical rows of symbol zones with 10 symbol zones in each row, a total of 100 zones, some being light transmitting and others light interrupting. The mask is provided with a number of actuators, one of which is seen at 16, located to selectively displace the mask 10 horizontal steps and 10 vertical steps, and any combination of intermediate steps, horizontally and vertically, thereby to bring any selected zone in the area 130 into the path of the light beam between pairs of lenses, as for example pair 110*a* and 111*a*. With all of the diffeent areas 130 being projected onto sheet 114, 100 different pictures might be selectively transmitted onto that portion of sheet 114 within the rightwardly projected area of the two lens banks. Advantages include the characteristic short projection length, large display area, and small displacement of the mask.

We claim:

1. In the method of transforming information wherein use is made of a single radiation inhibitor containing a two dimensional array of radiation passing discrete symbol zones, the steps that include directing radiation and toward a portion of said inhibitor, confining said path to a cross sectional area at the inhibitor to subtend at least the entirety of one of said zones but substantially less than the entireties of all of said zones, effecting both translational and pivotal displacement of said inhibititor in multiple dimensional relation to said path to bring said zones into said radiation path in controllable sequence thereby to pass said radiation in accordance with an informational symbol sequence, and supporting the single inhibitor at spaced locations through which displacement is transmitted to the inhibitor in different directions.

2. The method of claim 1 including releasably locking the inhibitor in position with a selected symbol zone in the radiation path.

3. In the method of transforming information wherein use is made of a single light mask containing a two dimensional array of light passing discrete symbol zones at least some of which define spaced alphanumeric characters, the steps that include directing light in a confined path and toward a portion of the mask, confining said path to a cross sectional area at the mask to subtend at least the entirety of one of said zones but substantially less than the entireties of all of said zones, independently displacing the mask at four locations and in multiple dimensional relation to said path to bring said zones into said light path in controllable sequence thereby to pass the light in accordance with an informational symbol sequence, and supporting the mask at spaced locations through which said displacement is transmitted to the mask in different directions.

4. The method of claim 3 in which said displacing includes bodily translating and pivoting the mask, and stopping the mask in positions to momentarily hold selected symbol zones in said light path.

5. The method of claim 3 including releasably frictionally locking the mask in position with a selected symbol zone in the light path.

6. The method of claim 3 including displaying the light passing through said zones.

7. The method of claim 3 in which said displacement of the mask is carried out by independently translating the mask at two locations and by independently rotating the mask by transmitting motion thereto at two additional locations.

8. For use in combination with radiation directed in a confined path, a single radiation inhibitor containing a two-dimensional array of radiation passing discrete symbol zones, and means operatively connected with the inhibitor to displace the inhibitor in different directions and in multiple dimensional relation to said path in controllable sequence to bring said zones into said radiation path thereby to pass the radiation in accordance with an informational symbol sequence, said path being confined to a cross sectional area of a size at the inhibitor to subtend at least the entirety of one of said zones but substantially less than the entireties of all of said zones.

9. For use in combination with light directed in a confined path, a light mask containing a two dimensional array of light passing discrete symbol zones at least some of which define spaced alphanumeric characters, and actuator means operatively connected with the mask to displace the mask in different directions and in multiple dimensional relation to said path to bring the zones into said light path thereby in controllable sequence to pass the light in accordance with an informational symbol sequence, and means to confine said path to a cross sectional area of a size at the mask to subtend at least the entirety of one of said zones but substantially less than the entireties of all of said zones.

10. The combination as defined in claim 9 in which the actuator means includes multiple independently operable actuators located to displace the mask at multiple locations, the mask being supported for displacement at certain of said locations.

11. The combination as defined in claim 10 in which the mask has three locations to which displacement is respectively transmited by four actuators.

12. The combination as defined in claim 10 including means to control the independent operation of said actuators.

13. The combination of claim 10 including a light projection system for directing light in said confined path, and image display means in the path of the light transmitted by said mask zones.

14. The combination of claim 13 in which the symbol zones define arabic numerals spaced apart in each of two dimensions in a plane defined by the mask.

15. The combination of claim 14 in which the symbol zones also define decimal points associated with said numerals, and including means to cover and uncover the decimal symbol zone when said zone is in the light path.

16. The combination of claim 10 in which the symbol zones define multiple spaced groups of symbol zones, and including additional light masking apparatus defining a window arranged to pass light in a beam of a size completely subtending at least one of said symbol zones in a group and to illuminate less than all of the symbol zones of a selected group, said actuators being operable to displace the first mentioned mask to bring a selected group of symbol zones into position for illumination via said window, and including additional actuator means to displace the additional masking apparatus in such relation to the first mentioned mask that light passed by the window selectively illuminates symbol zones of a selected group.

17. The combination of claim 16 in which said additional masking apparatus includes two masks having windows elongated in different directions and superimposed to define a light passing aperture.

18. The combination as defined in claim 11 in which said actuator means includes a motion transmitting lever to which two of the actuators have motion transmitting connection for translating and rotating the lever, the mask and lever having pivotal interconnection, the remaining two actuators located to pivot the mask about said pivotal interconnection.

19. The combination of claim 11 in which each actuator has a motion transmitting element movable between two predetermined positions, and the mask has characteristic positions determined by the positions of said elements.

20. In combination, a light projection system for directing light in multiple generally parallel spaced discrete paths, a light mask containing an array of areas, light in said paths being concentrated at the mask by said projection system, each area including multiple light passing and interrupting symbol zones, and actuator means connected to displace the mask in relation to said paths to bring selected symbol zones in different of said areas into said paths thereby to pass the light in accordance with an informational symbol sequence, the spacing of adjacent light paths at the mask being substantially greater than the overall transverse dimension of individual of said zones.

References Cited
UNITED STATES PATENTS

| | | | |
|---|---|---|---|
| 2,681,634 | 6/1954 | Polley | 40—130 |
| 2,834,250 | 5/1958 | Steffani | 40—130 |
| 2,982,038 | 5/1961 | Kass | 40—28 |
| 3,086,306 | 4/1963 | Morgan | 40—28 |
| 3,159,932 | 12/1964 | Polley | 40—28 |

EUGENE R. CAPOZIO, *Primary Examiner.*

W. J. CONTRERAS, *Assistant Examiner.*